(12) United States Patent
Talja et al.

(10) Patent No.: US 7,227,325 B1
(45) Date of Patent: Jun. 5, 2007

(54) METHOD AND ARRANGEMENT FOR PROTECTING A FREQUENCY CONVERTER

(75) Inventors: Markku Talja, Järvenpää (FI); Simo Pöyhönen, Vantaa (FI)

(73) Assignee: ABB Oy, Helsinki (FI)

( * ) Notice: Subject to any disclaimer, the term of this patent is extended or adjusted under 35 U.S.C. 154(b) by 388 days.

(21) Appl. No.: 11/010,570

(22) Filed: Dec. 14, 2004

(30) Foreign Application Priority Data

Dec. 19, 2003  (FI) ................................. 20031868

(51) Int. Cl.
*H02H 7/122* (2006.01)
*H02H 3/027* (2006.01)

(52) U.S. Cl. .................... 318/434; 318/459; 388/903; 361/33

(58) Field of Classification Search ............... 318/434, 318/459, 722–724, 801; 388/903, 907.2, 388/909, 928.1; 361/23–33
See application file for complete search history.

(56) References Cited

U.S. PATENT DOCUMENTS

| | | | | |
|---|---|---|---|---|
| 3,601,681 A | * | 8/1971 | Boksjo | 363/51 |
| 5,115,388 A | * | 5/1992 | Shigekane | 363/56.03 |
| 5,734,256 A | * | 3/1998 | Larsen et al. | 323/207 |
| 6,021,035 A | | 2/2000 | Larsen et al. | |
| 6,335,608 B1 | * | 1/2002 | Takahashi | 318/811 |
| 6,653,806 B1 | * | 11/2003 | Ono | 318/375 |
| 7,049,787 B2 | * | 5/2006 | Knapp et al. | 318/801 |
| 7,164,562 B2 | * | 1/2007 | Virtanen | 361/20 |
| 7,176,651 B2 | * | 2/2007 | Kifuku et al. | 318/801 |
| 2005/0237678 A1 | * | 10/2005 | Virtanen | 361/18 |

FOREIGN PATENT DOCUMENTS

| | | |
|---|---|---|
| EP | 0 970 840 | 1/2000 |
| GB | 1 241 334 | 8/1971 |
| JP | 60032520 | 2/1989 |
| JP | 06178567 | 6/1994 |
| JP | 11155231 | 6/1999 |
| JP | 2001086761 | 3/2001 |

* cited by examiner

*Primary Examiner*—Bentsu Ro
(74) *Attorney, Agent, or Firm*—Dykema Gossett PLLC

(57) ABSTRACT

A method and an arrangement for protecting a frequency converter in a system comprising a motor and a frequency converter supplying it via a bipolar or multipolar supply connection, the arrangement comprising first connecting means adapted to couple poles of the supply connection mutually substantially into short-circuit in response to a detection of a fault in the frequency converter.

14 Claims, 1 Drawing Sheet

METHOD AND ARRANGEMENT FOR PROTECTING A FREQUENCY CONVERTER

FIELD OF THE INVENTION

The invention relates to a frequency converter for feeding a motor, and particularly to protecting a frequency converter.

BACKGROUND OF THE INVENTION

A frequency converter is a device typically used to control a motor. FIG. 1 shows an example of a frequency converter connection. The frequency converter 20 is typically composed of two converters, a rectifier 21 and an inverter 22, between which is provided a direct voltage or a direct current intermediate circuit 23. The rectifier 21 and the inverter 22 may also be located physically separately, and one rectifier may supply a plurality of inverters via a common intermediate circuit 23. An example of a rectifier 21 is a diode bridge, which obtains its supply 40 from an alternating current source 10, which is for instance a 50 or 60-Hz alternating current network, and an example of an inverter 22 is an inverter bridge implemented by means of transistors (e.g. IGBT, Insulated-gate Bipolar Transistor) or other semiconductors. An inverter 22 is typically used to adjust the power transferred from the intermediate circuit 23 of the frequency converter to a motor 30. Accordingly, in the figure, the supply connection 50 between the inverter 22 and the motor 30 is for instance a three-phase alternating current connection, although the figures show the connection with one line for the sake of clarity. The control of the motor 30 with the inverter can be implemented reliably in such a manner that the motor implements accurately the desired speed or torque instruction, for example.

The frequency converter 20 typically comprises a protective diagnostics in case of internal malfunction of the frequency converter, which operate in such a manner that for instance when one branch of the semiconductor of one phase of the inverter 22 cannot be turned off (the branch shorts or gets erroneously continuous ignition regardless of the control), the diagnostics of the frequency converter detect the fault and stop the frequency converter.

The problem in the above-described arrangement is that the motor 30 is able to supply magnetization energy, i.e. what is known as reverse power via the branch of the faulty phase and the zero diodes of the other phases to the fault point, i.e. the short-circuit in the inverter 22, whereby, at worst, the semiconductor module may explode and cause great damage in the frequency converter. For example, the IGBT semiconductor module may be destroyed in said manner even during a time of less than 10 ms depending on the properties of the motor, the type of the semiconductors in the frequency converter, the voltage of the intermediate circuit 23, the output frequency at the fault moment and the position of the rotor of the motor 30 at the fault moment, for example.

BRIEF DESCRIPTION OF THE INVENTION

The object of the invention is thus to provide a method and an apparatus for implementing the method so as to solve or at least alleviate the above problem. The object of the invention is achieved with an arrangement and method that are characterized in what is stated in independent claims 1 and 9. Preferred embodiments of the invention are described in the dependent claims.

The invention is based on connecting the poles of the supply connection between the frequency converter and the motor mutually substantially into short-circuit in response to the detection of a fault in the frequency converter, whereby the short-circuit generates a parallel route for the magnetizing current supplied by the motor.

An advantage of the method and system of the invention is that part of the current supplied by the motor in malfunction is distributed to the parallel route generated by the short-circuit, and, correspondingly, the current circulating via the frequency converter is decreased. Thus the current loading experienced by the frequency converter is decreased and the probability of additional damage in the frequency converter is decreased.

BRIEF DESCRIPTION OF THE FIGURES

In the following, the invention will be described in more detail in connection with preferred embodiments with reference to the accompanying drawing, in which.

DETAILED DESCRIPTION OF THE INVENTION

Figure 1:
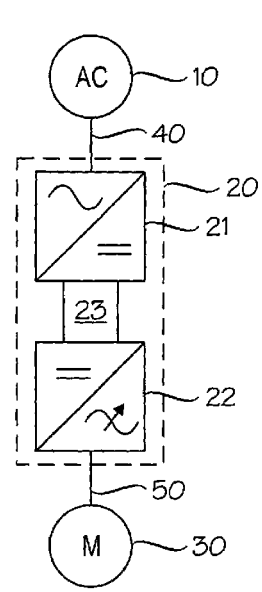
FIG. 1 shows a block diagram of a frequency converter connection.

The example of a frequency converter connection shown in FIG. 1 was described above in the general part of the present description, and will not be repeated here. It is to be noted that the use of the invention is not restricted to any given type of frequency converter 20. Neither does the type of motor 30 have any significance to the basic idea of the invention, but it may be for instance a single-phase, three-phase or six-phase induction motor.

Figure 2:
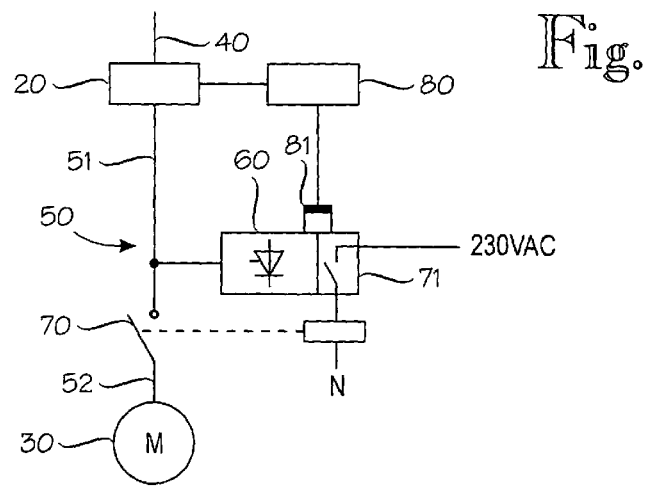
FIG. 2 shows a block diagram of a frequency converter connection in accordance with an embodiment of the invention.

FIG. 2 shows a block diagram of a frequency converter connection in accordance with an embodiment of the invention. In accordance with the basic idea of the invention, the poles of the supply connection 51 and 52 between the frequency converter 20 and the motor 30 are connected mutually substantially into short-circuit in response to a detection of a fault in the frequency converter 20. In FIG. 2, the supply connection 50 between the frequency converter 20 and the motor 30 is shown by one line for the sake of clarity. However, the supply connection 50 comprises two or more poles. If the motor 30 is for instance a single-phase motor, the supply connection 50 is bipolar comprising a phase conductor and a zero conductor. Correspondingly, if the motor 30 is a three-phase motor, the supply connection 50 is triple-pole comprising three phase conductors. However, the number of poles in the supply connection 50 or the type of motor has no significance to the basic idea of the invention. In the connection shown in FIG. 2, the poles of the supply connection 50 are shorted with a switch 60, which is connected to the poles of the supply connection 50. The switch 60 is preferably a semiconductor switch, for instance what is known as a crowbar type of thyristor switch. The use of a semiconductor switch is preferable, since it enables rapid generation of a short-circuit connection in malfunction. The switch 60 obtains a control signal 81 from a fault diagnostics unit 80 when the diagnostics unit detects a fault, such as a situation wherein one branch of the semiconductor of one phase of the inverter of the frequency converter 20 cannot be turned off (the branch shorts or obtains erroneously continuous ignition regardless of the control). The diagnostics unit 80 may be part of the frequency converter 20 or a separate element as is shown in the figure. As regards the basic idea of the invention, it is only essential that the switch 60 can be triggered in response to a fault in the frequency converter 20. Furthermore, the triggering of the switch 60 can be restricted to take place only in certain kinds of malfunction of the frequency converter 20. In accordance with a preferred embodiment of the invention, the switch 60 is connected to the supply connection 50 between the frequency converter 20 and the motor 30 at a point where a section 51 of the supply connection between said point and the frequency converter is longer than a section 52 of the supply connection between said point and the motor. In this context, the term supply connection should be understood to comprise the conductor connection between the output of the frequency converter 20 and the supply terminals of the motor 30 as well as the terminals of the output of the frequency converter and the motor. Accordingly, the switch 60 can be connected not only to the conductor connection between the frequency converter 20 and the motor 30, for example, but also directly to the supply terminals of the motor 30, for example. Connecting the switch 60 to the supply connection 50 as close to the motor 30 as possible brings forth the advantage that in malfunction a relatively larger part of the current supplied by the motor circulates via the short-circuit point generated by the switch 60 and, correspondingly, a smaller part via the frequency converter 20, since the part of the current circulating via the frequency converter 20 has to encounter for instance the entire impedance of the conductor section 51 and 52 between the frequency converter 20 and the motor 30. In addition, this being so, the switch 60 itself is preferably placed close to the motor 30, whereby also the conductors between the switch 60 and the supply connection 50 remain short. Other possible impedances of the system also affect current distribution; for example, the frequency converter 20 may be provided with output chokes. Generally speaking, in order for as large a part as possible of the current supplied by the motor 30 in malfunction to pass via the short-circuit point generated by the switch 60, it is thus preferable that the impedance from the motor 30 to the short-circuit point generated by the switch 60 be as small as possible and, correspondingly, the impedance from the motor 30 to the frequency converter 20 as large as possible.

According to a preferred embodiment of the invention, the supply connection 50 between the motor 30 and the frequency converter 20 is broken at least for one pole after said poles are connected into short-circuit. Furthermore, in accordance with a preferred embodiment, the supply connection between the motor and the frequency converter is broken for all poles. In accordance with this preferred embodiment of the invention, FIG. 2 shows a second switch 70. The switch 70 is for instance a contactor preferably controlled by means of a relay 71. The relay 71 preferably obtains its control from the diagnostics unit 80 in malfunction of the frequency converter, as does the switch 60. Because of the relative slowness of the operation of the relay 71 and the contactor 70 (operating time typically e.g. 10 to 100 ms) as compared with the semiconductor switch 60 (operating time e.g. about 1 ms), the contactor 70 does not operate until after the operation of the switch 60. In a normal state, the contactor 70 is in a conductive state, i.e. its contacts are closed. Controlled by the signal coming from the diagnostics unit 80 and by the relay 71, the contactor 70 is opened, whereby the motor 30 is separated from the frequency converter 20 and the switch 60. Accordingly, in malfunction, the switch 60 is preferably first closed, whereby the reverse current supplied by the motor 30 is distributed in proportion to voltage losses between the short-circuit generated by the switch 60 and the frequency converter 20, until the contactor 70 is opened. Thus, it is to be noted that in a solution according to the basic idea of the invention, there is no need at all for the contactor 70 (or a corresponding switch). If only the switch 60 generating the short-circuit is used, this switch 60 is then preferably dimensioned such that when generating the short-circuit, it tolerates all the reverse current supplied by the motor 30. When the contactor or a corresponding switch 70 is used, the switch 60 should preferably be dimensioned to tolerate the reverse current supplied by the motor 30 only as long as it takes from the closing of the switch 60 to the opening of the switch 70, i.e. typically some dozens of milliseconds, for example.

Figure 3:
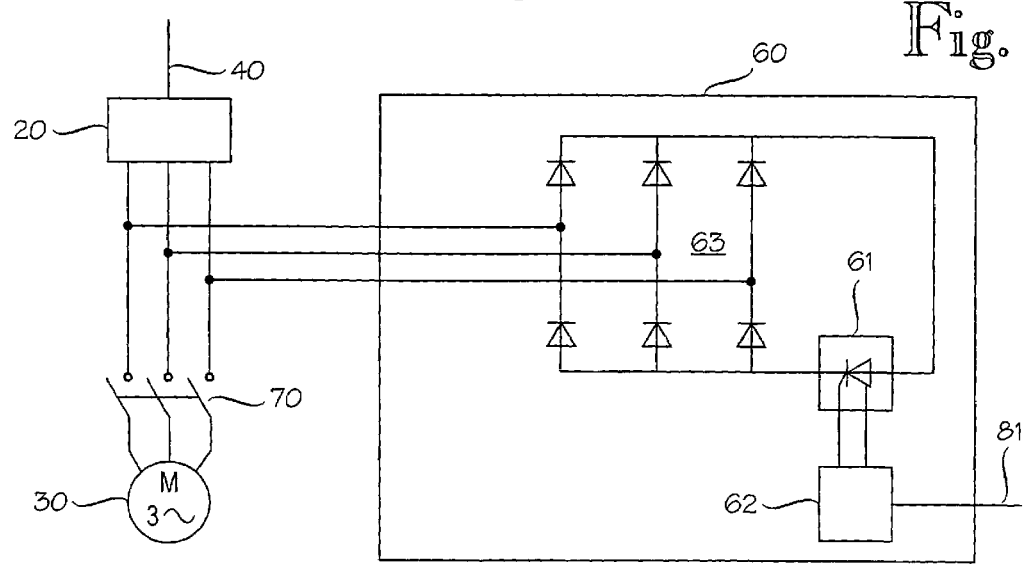
FIG. 3 shows a block diagram of a frequency converter connection in accordance with an embodiment of the invention.

FIG. 3 shows a block diagram of a frequency converter connection in accordance to an embodiment of the invention. In the system of the figure, the motor 30 is a three-phase motor, and the supply connection between the motor 30 and the frequency converter 20 is triple-pole, i.e. in this case composed of three phase conductors, as the figure shows. The figure further shows an all-poled connection of an optional contactor 70, if employed, to the supply connection between the motor 30 and the frequency converter 20. The figure further shows a possible internal connection of the switch 60. It is to be noted that the figure only shows elements essential to the understanding of the invention. In the example of FIG. 3, the switch 60 is a crowbar type of thyristor switch comprising an alternating current bridge 63 composed of six diodes, and a thyristor 61. The connection operates such that the control signal 81 is supplied to a control circuit 62 in the thyristor. In response to the control signal 81, a control circuit 62 generates a suitable control pulse that ignites the thyristor 61. When the thyristor 61 is ignited and starts to conduct, the poles of the supply connection between the motor 30 and the frequency converter 20 short via the connection provided by the alternating current bridge 63 and the thyristor 61. The components of the switch 60 and any contactor or other switch 70 employed are preferably selected in accordance with the parameters of the system wherein the switches are employed at each particular time, such as the nominal voltage of the system and the currents occurring in the system, for example. When a switch 60 shown in FIG. 3 is employed, it is also preferable to select diode and thyristor types having an as low a dropout voltage as possible as the diodes of the alternating current bridge 63 and as the thyristor 61, in order for the dropout voltages of the two diodes and the thyristor in the switch 60, when it is operating, to generate as low a resistance as possible to the current supplied by the motor 30.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. An arrangement for protecting a frequency converter in a system comprising a motor and a frequency converter supplying it via a bipolar or multipolar supply connection, comprising first connecting means adapted to couple poles of the supply connection mutually substantially into short-circuit in response to a detection of a fault in the frequency converter.

2. An arrangement as claimed in claim 1, further comprising second connecting means adapted to break the supply connection between the motor and the frequency converter for at least one pole after said poles are connected into short-circuit.

3. An arrangement as claimed in claim 2, wherein the second connecting means are adapted to break the supply connection between the motor and the frequency converter for all poles.

4. An arrangement as claimed in claim 2, wherein the second connecting means comprise a contactor.

5. An arrangement as claimed in claim 1, wherein the first connecting means are connected to the supply connection between the motor and the frequency converter at a point where a section between said point and the frequency converter is longer than a section between said point and the motor.

6. An arrangement as claimed in claim 1, wherein the first connecting means comprise a semiconductor switch.

7. An arrangement as claimed in claim 6, wherein the first connecting means comprise a thyristor.

8. An arrangement as claimed in claim 1, wherein the motor is a three-phase motor and the supply connection from the frequency converter to the motor is triple-pole.

9. A method of protecting a frequency converter in a system comprising a frequency converter and a motor connected thereto, the method comprising:
   supplying the motor from the frequency motor via a bipolar or multipolar supply connection, and
   connecting poles of the supply connection mutually substantially into short-circuit in response to a detection of a fault in the frequency converter.

10. A method as claimed in claim 9, further comprising:
    breaking the supply connection between the motor and the frequency converter for at least one pole after said poles are connected into short-circuit.

11. A method as claimed in claim 10, further comprising:
    breaking the supply connection between the motor and the frequency converter for all poles.

12. A method as claimed in claim 9, further comprising:
    connecting the poles of the supply connection into short-circuit at a point of the supply connection that is closer to the motor than to the frequency converter.

13. A method as claimed in claim 9, further comprising:
    performing said connecting into short-circuit with a switch comprising a semiconductor.

14. A method as claimed in claim 13, further comprising:
    performing said connection into short-circuit with a switch comprising a thyristor.

* * * * *